United States Patent
Rupp

Patent Number: 5,542,338
Date of Patent: Aug. 6, 1996

[54] ROTARY SLIDE VALVE FOR POWER-ASSISTED STEERING SYSTEMS OF MOTOR VEHICLES

[75] Inventor: Arthur Rupp, Hüttlingen, Germany

[73] Assignee: ZF Friedrichshafen AG, Friedrichshafen, Germany

[21] Appl. No.: 356,175

[22] Filed: Dec. 16, 1994

[30] Foreign Application Priority Data

Jun. 19, 1992 [DE] Germany ............... 42 19 978.6

[51] Int. Cl.$^6$ .................. F15B 9/10; F17D 3/00
[52] U.S. Cl. ............... 91/375 R; 91/375 A; 137/675.21; 180/441; 29/890.126
[58] Field of Search ............... 91/375 R, 375 A, 91/434; 137/625.21, 625.22, 625.23, 625.24; 180/132; 29/890.126, 890.127, 890.132

[56] References Cited

U.S. PATENT DOCUMENTS

| | | | |
|---|---|---|---|
| 3,271,845 | 9/1966 | Breher | 29/890.127 |
| 3,651,683 | 3/1972 | Liebergeld . | |
| 3,746,045 | 7/1973 | Bunker et al. | 137/625.24 |
| 4,272,056 | 6/1981 | Komamura et al. | 91/375 A X |
| 4,347,780 | 9/1982 | Takahashi | 91/375 A |
| 4,532,690 | 8/1985 | Delbon et al. | 29/451 |
| 4,703,544 | 11/1987 | Saga . | |
| 4,788,877 | 12/1988 | Robinson et al. . | |

FOREIGN PATENT DOCUMENTS

| | | |
|---|---|---|
| 2114453 | 12/1971 | Germany . |
| 3006038 | 10/1980 | Germany . |
| 3234667 | 5/1983 | Germany . |

*Primary Examiner*—Hoang Nguyen
*Attorney, Agent, or Firm*—Larson & Taylor

[57] ABSTRACT

A rotary slide valve (1) for power-assisted steering systems of motor vehicles contains a rotary slide (2) that is guided in a limited rotary fashion in a control box (3). Control box (3) is connected with a valve exit member (7) in a nonrotating manner. Rotary slide (2) is connected with valve exit member (7) via a torsion rod (9) and a dead-travel clutch (10). Dead-travel clutch (10) consists of a catch section piece (16) of the valve exit member (7) and of recesses (17) that are fashioned on the free end of rotary slide (2). Rotary slide (2) with its longitudinal control grooves (12, 13) and with its recesses (17) is made by way of a noncutting production process. This production process is simplified and the rotary slide valve (1) is made smaller in that the recesses (17) of rotary slide (2) are arranged in longitudinal control grooves (13) of rotary slide (2) that are open toward one end.

7 Claims, 1 Drawing Sheet

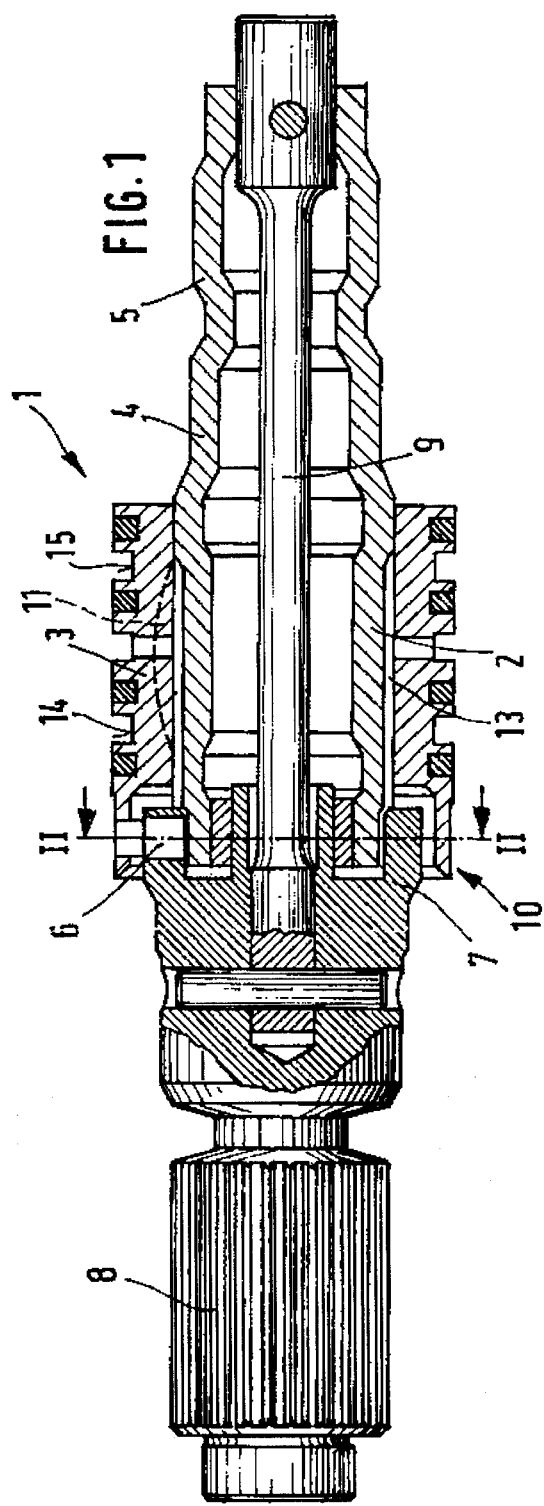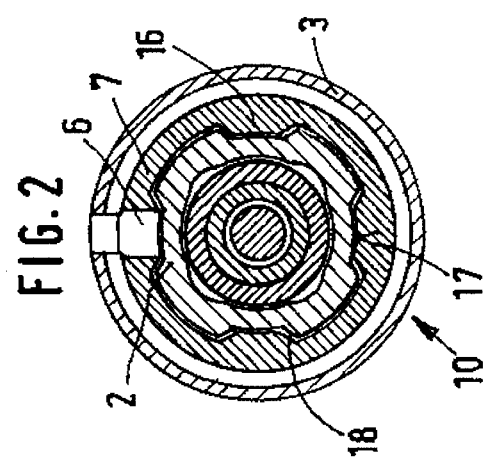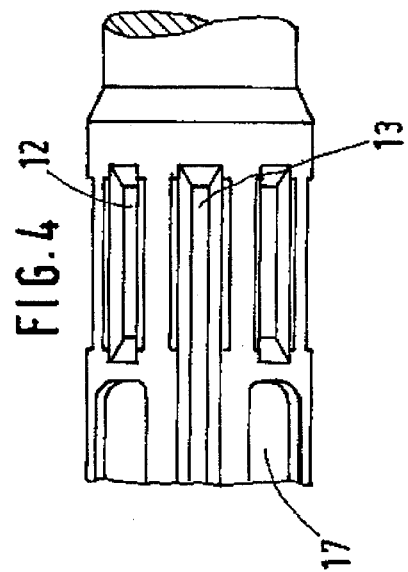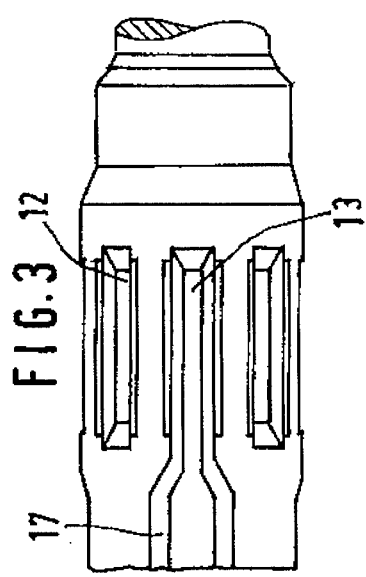

ROTARY SLIDE VALVE FOR POWER-ASSISTED STEERING SYSTEMS OF MOTOR VEHICLES

This invention relates to a rotary slide valve for power-assisted steering systems of motor vehicles. The rotary slide valve contains a rotary slide that is connected with a valve input member in a nonrotating manner and a control box that is connected with a valve output member in a nonrotating manner. The valve input member and the rotary slide are connected with the valve output member via a torsion rod and a backlash coupling. The rotary slide is arranged coaxially in the control box in a rotary manner. The two parts can be turned with respect to each other at most by the rotation angle of the backlash coupling. The control box has internal longitudinal control grooves and the rotary slide has external longitudinal control grooves that are partly limited in terms of their axial length and that are partly opened at least toward one end and that cooperate with each other to control the flow of a pressure medium to and from two working chambers of a servomotor. The backlash coupling consists of a driving profile of a valve output member and of recesses of the rotary slide in which the driving profile engages.

Such a rotary slide valve is known, for example, from U.S. Pat. No. 3,746,045. Like other known rotary slide valves, the known rotary slide valve contains a rotary slide that is guided in an axial borehole of a control box. The rotary slide is connected with the valve output member via a torsion rod. Besides, the rotary slide is connected with the valve output member via a backlash coupling. Such a backlash coupling limits the relative rotation of the two valve elements with respect to each other and creates a mechanical stop of the valve after the rotational limit of the backlash coupling has been reached. Via this mechanical stop, it must be possible—in case of failure of the auxiliary power support or in case of a rupture of the torsion rod—to transmit the entire mechanical steering force. Such mechanical steering forces can be very strong. In the known rotary slide valve, the backlash coupling therefore is made, on the one hand, in the form of two powerfully fashioned projections of the pinion body and, on the other hand, in the form of two slit-like recesses in a thickened end of the rotary slide. That results in the dimensions of the rotary slide valve that are determined by the possible high mechanical stresses but that frequently are too great for the limited installation space in an auxiliary power steering unit of a motor vehicle. The thickening of the end of the rotary slide moreover results in all accumulation of material that works against a reasonably priced manufacture of the rotary slide.

The purpose of the invention is to reduce the size of the rotary slide valve and to facilitate a more reasonably priced manufacturing process, although the magnitude of the transmissible mechanical moment should be preserved.

This problem is solved by the rotary slide valve of the present invention. The solution, in particular, consists in the fact that the recesses of the backlash coupling on the rotary slide are made together with the longitudinal control grooves in a noncutting manner.

Advantageous and practical developments of the invention are given in the subclaims. As a result of the combined noncutting manufacture of the recesses and the longitudinal control grooves on the rotary slide, it is possible to arrange the recesses in the rotary slide's longitudinal control grooves that are open toward one end. As a result, these unilaterally open longitudinal control grooves and the recesses can be made with a single tool in one work step. On the other hand, if the longitudinal control grooves that are open toward one side are to retain an unchanged throughflow cross section in all operating states, then the recesses can be arranged at the end of the rotary slide between the longitudinal control grooves that are open toward that end. In this case, the recesses can be made with one tool that is also used to make the bilaterally closed longitudinal control groove. Here, it is practical for these recesses be flush with these longitudinal control grooves so that one gets a simple tool that is offset in terms of height.

It is practical to make the rotary slide with its longitudinal control grooves, its control edges, and its recesses by means of cold shaping.

If the recesses of the rotary slide are fashioned in the rotary slide's longitudinal control grooves that are open toward one end, then the recesses are made wider than the longitudinal control grooves in their control sector in that they are provided with control edges. In that way, on the one hand, one can facilitate the pickup of the driving profile of the valve output member and the rotation angle between the two parts. Besides, this establishes a throughflow of the pressure medium out of the longitudinal control grooves between the rotary slide and the valve output member.

The invention is not confined to the combination of features given in the claims. The expert in the field will find additional meaningful possibilities of combining claims and individual claim features on the basis of the problem statement.

The invention will be explained in greater detail below with the help of two practical examples illustrated in the drawing.

FIG. 1 is a longitudinal profile through the rotary slide valve according to the invention;

FIG. 2 is a lateral profile through the rotary slide valve along line II—II in FIG. 1;

FIGS. 3 and 4 show two practical versions of the invention with one view, each, of the rotary slide.

A rotary slide valve 1 contains a first valve element in the form of a rotary slide 2 that is rotatably guided in a second valve element in the form of a control box 3. Rotary slide 2 is connected with a valve input member 4 in a nonrotating fashion. Valve input member 4 has a steering spindle connection 5 with which valve input member 4 is connected, for example, by means of a steering spindle (not shown) via a likewise, not illustrated, universal joint. Control box 3 is connected in a nonrotating manner via a pin 6 to a valve output member 7. Valve output member 7 at the same time represents an input member for the mechanical part of an auxiliary power steering unit, not illustrated, and is connected, for example, with a pinion 8 of the auxiliary power steering. Valve input member 4 and thus rotary slide 2 are connected with valve output member 7 via a torsion rod 9 and via a backlash coupling 10.

Control box 3 reveals internal longitudinal control grooves 11, while rotary slide 2 reveals external longitudinal control grooves 12 and 13 that are partly limited in terms of their axial length and that are partly open toward at least one end. FIGS. 3 and 4 show the longitudinal control grooves, both of whose ends are closed, labeled 12, the longitudinal control grooves that are open toward one of their ends in the direction toward valve output member 7, are designated with 13. The longitudinal control grooves 12 are used to control the flow of a pressure medium toward two ring grooves 14 and 15 that are arranged along the outer circumference of control box 3. Rings grooves 14 and 15, in turn, are connected with the—not illustrated—working chambers of a servo-motor. Longitudinal control grooves 13 are connected via their open end with the return to a tank, not illustrated.

Backlash coupling 10 on the side of valve output member 7 consists of a driving profile 16 that engages recesses 17 which are arranged along the outer circumference of rotary slide 2. In the practical example illustrated in FIG. 3, recesses 17 are arranged directly in the longitudinal control grooves 13. To receive the driving profile 16, recesses 17 are made correspondingly wider than the longitudinal control grooves 13 in the sector in which they cooperate with the longitudinal control grooves 11 of control box 3. Besides, recesses 17 must be made so wide that the rotation angle 18 required for the control of the rotary slide valve 1 will be generated in the turning direction between their side walls and driving profile 16. On the other hand, the pressure medium must be capable of flowing back unhindered out of the longitudinal control grooves 13.

In the practical example illustrated in FIG. 4, recesses 17 are arranged in the circumferential direction between longitudinal control grooves 13. In this case, longitudinal control grooves 13 have a uniform width over their entire length. The width of recesses 17 corresponds to the length of recesses 17 in FIG. 3. To facilitate reasonably priced manufacture with the help of a simple tool, recesses 13 are flush with longitudinal control grooves 12 in the practical example shown ill FIG. 4.

The described arrangement and design of recesses 17 with respect to longitudinal control grooves 12 and 13 can be achieved in a particularly favorable fashion in that rotary slide 2 is made by way of a noncutting production process. Rotary slide 2 with its longitudinal control grooves 12 and 13, including the control edges molded upon it and with its recesses 17, for example, by means of cold shaping.

The number of recesses 17 corresponds to the number of longitudinal control grooves 12 that are closed at both of their ends and the number of longitudinal control grooves 13 that are open toward one end. In that way, the ratio between the total number of longitudinal control grooves 12 and 13 and the number of recesses 17 is 2:1. That results in the advantage that it becomes impossible to make a mistake in assembling rotary slide 2 and control box 3.

References

1 Rotary slide valve
2 Rotary slide
3 Control box
4 Valve input member
5 Steering spindle connection
6 Pin
7 Valve output member
8 Pinion
9 Torsion rod
10 Backlash coupling
11 Longitudinal control groove
12 Longitudinal control groove
13 Longitudinal control groove
14 Ring groove
15 Ring groove
16 driving profile
17 Recess
18 rotation angle

We claim:

1. Rotary slide valve for power-assisted steering systems of motor vehicles, having a rotary slide which is connected non-rotatably to a valve input member, and having a control sleeve which is connected non-rotatably to a valve output member, the valve input member and the rotary slide being connected to the valve output member by a backlash coupling which has a rotation angle, the rotary slide being disposed with rotary motion coaxially in the control sleeve and the rotary slide and control sleeve being rotatable relative to one another to the limit of the rotation angle of the backlash coupling, the control sleeve having internal longitudinal control grooves and the rotary slide having external longitudinal control grooves which are partially delimited in their axial length and partially open towards at least one end and which cooperate with one another to direct a pressure medium to and from two working chambers of a servomotor, and the backlash coupling being formed by a driving profile of the valve output member and by recesses at the free end of the rotary slide into which recesses the driving profile engages, characterized in that the recesses of the backlash coupling on the rotary slide together with the longitudinal control grooves are manufactured by a non-cutting process.

2. Rotary slide valve according to claim 1, characterized in that the recesses of the rotary slide are formed in the longitudinal control grooves of the rotary slide which are open towards one end.

3. Rotary slide valve according to claim 1, characterized in that the recesses of the rotary slide are disposed in an outer peripheral surface of the rotary slide between the longitudinal control grooves of the rotary slide which are open towards one end.

4. Rotary slide valve according to claim 1, characterized in that the rotary slide including the longitudinal control grooves and the recesses is manufactured by cold forming.

5. Rotary slide valve according to claim 2, characterized in that the recesses at the ends of the open longitudinal control grooves are wider than the longitudinal control grooves in their control region.

6. Rotary slide valve according to claim 1, characterized in that the longitudinal control grooves which are open towards one end are connected to a return line leading to a container.

7. Rotary slide valve according to claim 1, characterized in that the ratio of the total number of longitudinal control grooves of the rotary slide to the number of recesses is 2:1.

* * * * *